United States Patent [19]

Langley, Jr.

[11] Patent Number: 4,606,499

[45] Date of Patent: Aug. 19, 1986

[54] VARIABLE THROAT NOZZLE

[76] Inventor: David T. Langley, Jr., 226 S. Main St., Los Angeles, Calif. 90012

[21] Appl. No.: 626,884

[22] Filed: Jul. 2, 1984

[51] Int. Cl.⁴ .................. B05B 17/04; B63H 11/10; F02K 1/06
[52] U.S. Cl. ................................ 239/11; 239/3; 239/265.11; 239/265.19; 239/690; 60/271
[58] Field of Search .............. 239/1, 3, 11, 690, 695, 239/698, 265.11, 265.19, 265.37, 265.43; 60/202, 203.1, 271

[56] References Cited

U.S. PATENT DOCUMENTS

| | | | |
|---|---|---|---|
| 2,968,919 | 1/1961 | Hughes et al. | 239/265.37 |
| 3,143,851 | 8/1964 | Nyman | 60/202 |
| 3,192,709 | 7/1965 | Hardy | 239/265.19 |
| 3,221,498 | 12/1965 | Bankston | 239/11 |
| 3,743,184 | 7/1973 | Mancus | 239/265.19 |
| 3,749,317 | 7/1973 | Osofsky | 239/265.19 |

Primary Examiner—Andres Kashnikow
Assistant Examiner—Mary Beth O. Jones
Attorney, Agent, or Firm—Matthew L. Ajeman

[57] ABSTRACT

The throat configuration of a converging-diverging nozzle (16) is varied by defining a throat area (18) of the nozzle by a plurality of impinging ion beams arranged symmetrically around the throat area of the nozzle and directed toward a central point (34) within the aforementioned throat area. Each of the ion streams is independently controlled so as to permit variation in the symmetry of the throat area as well as the size thereof, and permit deflections of the fluid flow paths as well as changes in, for example, a thrust generated by a fluid stream passing through the nozzle.

16 Claims, 2 Drawing Figures

U.S. Patent  Aug. 19, 1986  4,606,499
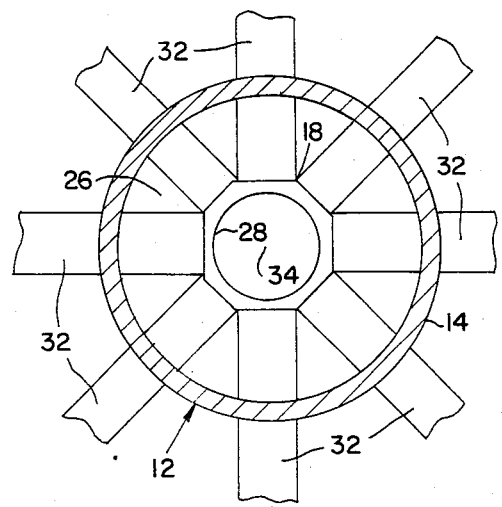
FIG. 2
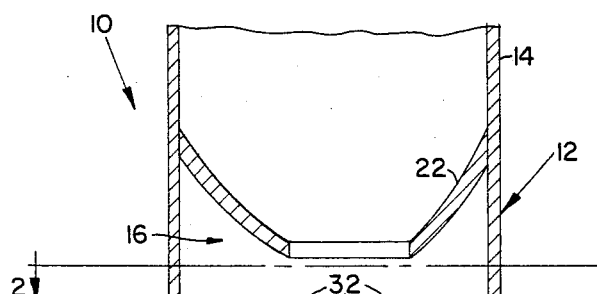
FIG. 1
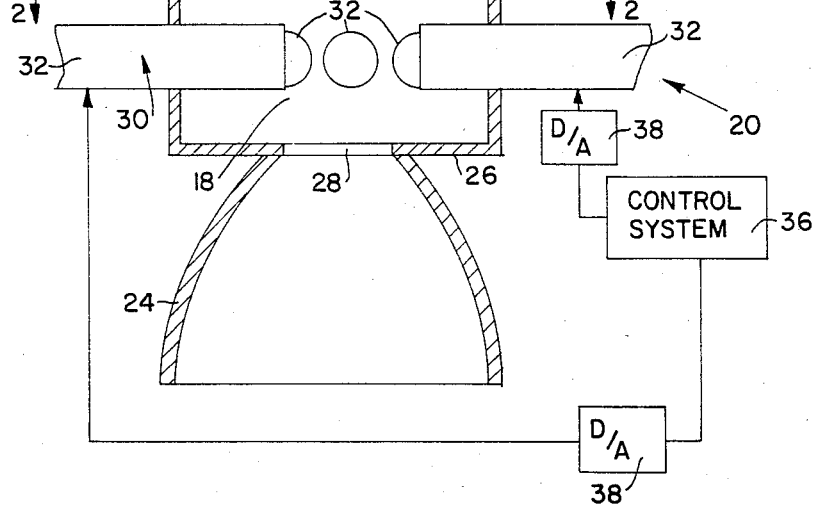

1

VARIABLE THROAT NOZZLE

BACKGROUND OF THE INVENTION

1. Field of the Invention

This invention relates generally to a nozzle having a variable throat barrier, and particularly to a converging-diverging nozzle in which a throat area of same is defined an annulus formed by converging streams of ions, and the like.

2. Description of the Prior Art

Although the general objective for most applications of rocket motors, and the like, is to produce a large thrust for a very limited period, the use of rocket motors with space shuttles, and the like, has created a need for variable-thrust rocket engines which can permit the thrust of the engine to be varied as a function of a specific maneuver of the associated vehicle. For efficient performance of a given rocket-motor, for a specific propellant combination and a constant total pressure at the entrance to an associated exhaust nozzle, the thrust developed by the rocket motor is directly proportional to the cross-sectional area of the throat of the exhaust nozzle. In other words, it is desireable to have a rocket engine burning propellants at a constant rate and varying the throat area of the exhaust nozzle in order to vary the engine thrust as desired.

It is known that a stream of ions can be used for propelling spacecrafts in, for example, the vacuum of outerspace. While positively charged ions have comparatively little mass, substantial thrust can be generated by an accelerated stream of such ions. One manner of generating a stream of ions is by the use of a linear particle accelerator which moves the particles, or ions, in a straight line. Although the source of particles for the first accelerators was the simplest of atomic elements, namely hydrogen, Cesium and other liquid metals are also employed as particle sources. Acceleration of the particles is accomplished by subjecting them to an electrical force. More specifically, the charge on the particle being accelerated can be used to accomplish the desired acceleration by use of other polarity electrical charges, or by alternating polarity of electrical charges subjected to the particles.

In linear accelerators, the acceleration is achieved by use of a plurality of electrodes, usually referred to as drift tubes, having increased length as they are arranged along the path of travel of a particle stream, and having alternate polarity electrical charges placed on them according to predetermined timing cycle. Since the frequency of an actuating signal generator is constant, an alternating current generator commonly being employed, each successive tube must be longer so that the ions will travel within each tube for the same length of time, but at a higher speed, as the ions proceed downstream of the series of tubes.

SUMMARY OF THE INVENTION

It is an object of the present invention to provide a converging-diverging nozzle having a variable throat area.

It is another object of the present invention to provide a nozzle having a throat area defined by an annular ring of converging ion streams.

Yet another object of the present invention is to provide a variable-throat nozzle in which a throat area of the nozzle can be varied in configuration as well as in cross-sectional area.

These and other objects are achieved, according to the present invention, by providing a variable throat nozzle apparatus comprising a nozzle defining a throat area and arranged in a fluid flow stream for directing the fluid flow along a predetermined path, and a flow area control arrangement associated with the throat area of the nozzle for varying the throat area as desired. More specifically, the nozzle is a converging-diverging nozzle in which the throat area thereof is defined by a plurality of ion stream forming devices arranged substantially perpendicularly to the fluid flow through the nozzle, with the ion stream forming devices arranged impinging on the fluid flow at the throat area of the nozzle for varying the throat area in a desired fashion. The ion stream forming devices preferably include a plurality of ion generating guns each arranged on a respective radius extending from a central point of the throat area of the nozzle, with each of the ion generating guns being arranged in a plane common with the other of the guns and disposed symmetrically and equidistant from one another around the nozzle.

Although a variable throat nozzle, according to the present invention, may have many applications, it particularly is intended for use as the exhaust nozzle for a rocket motor.

It is an advantage of the present invention that a converging-diverging nozzle can be provided with a very precisely defined throat area.

It is another object of the present invention that rocket motors, and the like, can be provided with more efficient exhaust nozzles.

Still another advantage of the present invention is that the thrust from a rocket engine can be varied while propellant consumption in the engine remains constant.

BRIEF DESCRIPTION OF THE DRAWINGS

FIG. 1 is a diagrammatic, fragmentary, vertical, longitudinal sectional view showing a nozzle apparatus, according to the present invention, employed as the exhaust nozzle for a rocket engine.

FIG. 2 is a diagrammatic, fragmentary, sectional view taken generally along the line 2—2 of FIG. 1.

DESCRIPTION OF THE PREFERRED EMBODIMENTS

Referring now more particularly to the figures of the drawing, a rocket engine 10 comprising a conventional combustion chamber 12 including a generally cylindrical wall 14 and a burner assembly, not shown but of a conventional nature, for generating a fluid flow under pressure, has associated therewith a nozzle apparatus 16 in accordance with the present invention and defining a throat area 18 arranged in the fluid flow stream generated by chamber 12 for directing the fluid flow along a predetermined path. As can be readily appreciated from FIG. 1, the nozzle apparatus 16 is a converging-diverging nozzle as will be described in greater detail below. Associated with throat area 18 is a flow area control arrangement 20 disposed for varying the configuration of the throat area 18. By the word "configuration" as used herein will mean either the size or symmetry, or both, of the cross-sectional area of the throat of nozzle apparatus 16.

Nozzle apparatus 16 includes a converging section 22 disposed entirely within the wall 14 of combustion chamber 12 so as to form an extension of chamber 12 and arranged for receiving the fluid flow generated by chamber 12 so as to funnel the flow into throat area 18 formed at the very bottom of cylindrical wall 14 of combustion chamber 12. Completing nozzle apparatus 16 is a diverging section 24 attached to and arranged extending away from a bottom wall 26 which cooperates with wall 14 to form the bottom portion of combustion chamber 12. A suitable opening 28 is provided in bottom wall 26 to provide a fluid flow path between throat area 18 and diverging section 24 and complete the fluid flow path extending from converging section 22, through throat area 18, and outletting at diverging section 24.

Flow area control arrangement 20 includes a plurality of ion stream forming devices 30 arranged substantially perpendularly to a fluid flow through nozzle apparatus 16, with the devices 30 impinging on the fluid flow at throat area 18 for varying as desired size and symmetry of the throat area 18 of nozzle apparatus 16. In particular, each of the ion stream forming devices 30 is an ion generating gun 32 of conventional construction and arranged on a respective radius extending from a central point 34 of throat area 18 of nozzle apparatus 16. The plurality of ion generating guns 32 are arranged in a common plane symmetrically around the throat area 18 of nozzle apparatus 16, with each of the guns 32 being spaced equi-distant from one another.

It is contemplated that any suitable, known, ion generating gun construction can be used for guns 32, with each of the guns 32 being independently controllable by a conventional control system 36, such as a microprocessor, and the like, arranged for selectively controlling the output of each of the guns 32 separately for varying the size and symmetry of the configuration of the throat area 18 of nozzle apparatus 16. Since the ion guns 32 should operate on an analog signal, conventional digital-to-analog converters 38 can be employed between the control system 36 and each of the guns 32.

As can be readily understood from the above description and from the drawing, a nozzle apparatus according to the present invention permits the configuration of a throat area of a converging-diverging nozzle to be readily varied as desired. Variation of the size of throat area 18 in a symmetrical manner will cause variations in thrust even though the rocket motor itself burns at a constant rate. Further, a non-symmetrical variation of the throat area of the nozzle apparatus according to the invention will cause a deflection of the gas flow path through the nozzle apparatus, permitting attitute variations of a vehicle associated with a rocket engine according to the present invention.

It is to be understood that the above description of the present invention is capable of various changes, modifications and adaptions, and such are intended to be included within the meaning and range of equivalents of the following claims.

I claim:

1. A variable throat nozzle apparatus, comprising, in combination:
   (a) nozzle means defining a throat area and arranged in a fluid flow stream for directing the fluid flow along a predetermined path; and
   (b) flow area control means associated with the throat area of the nozzle means for varying a configuration of the throat area, the flow area control means including ion stream forming means, the ion stream forming means impinging on the fluid flow at the throat area of the nozzle means for varying as desired the size and symmetry of the throat area of the nozzle means.

2. Apparatus as defined in claim 1, wherein the nozzle means includes a converging-diverging nozzle.

3. Apparatus as defined in claim 1, wherein the ion stream forming means includes a plurality of ion generating guns each arranged on a respective radius extending from a central point of the throat area of the nozzle means.

4. Apparatus as defined in claim 3, wherein the plurality of ion generating guns are arranged in a common plane symmetrically around the nozzle means, each of the guns being equidistant from one another.

5. Apparatus as defined in claim 4, wherein the nozzle means includes a converging-diverging nozzle.

6. Apparatus as defined in claim 5, wherein the nozzle means includes a converging section and further including combustion chamber means for generating a fluid flow under pressure, the converging section forming an extension of the combustion chamber means and arranged for receiving the fluid flow generated by the combustion chamber means.

7. Apparatus as defined in claim 6, further including control means connected to the plurality of ion generating guns for selectively controlling the output of same, each of the guns being separately controllable for varying the size and symmetry of the throat area of the nozzle means.

8. Apparatus as defined in claim 1, wherein the nozzle means includes a converging section, and further including combustion chamber means for generating a fluid flow under pressure, the converging section forming an extension of the combustion chamber means and arranged for receiving the fluid flow generated by the combustion chamber means.

9. Apparatus as defined in claim 1, further including control means connected to the flow area control means for selectively controlling an output of same.

10. Rocket engine apparatus, comprising, in combination:
    (a) combustion chamber means for generating a fluid flow under pressure;
    (b) nozzle means defining a throat area and connected to the combustion means for receiving a fluid flow from the combustion chamber means and directing the fluid flow along a fluid flow path; and
    (c) flow area control means associated with the throat area of the nozzle means for varying a configuration of the throat area; the throat area control means including ion stream forming means arranged perpendicularly to a fluid flow through the nozzle means, the ion stream forming means impinging on the fluid flow at the throat area of the nozzle means for varying as desired the size and symmetry of the throat area of the nozzle means.

11. Apparatus as defined in claim 10, wherein the nozzle means includes a converging-diverging nozzle.

12. Apparatus as defined in claim 10, wherein the ion stream forming means includes a plurality of ion generating guns each arranged on a respective radius extending from a central point of the throat area of the nozzle means.

13. Apparatus as defined in claim 12, wherein the plurality of ion generating guns are arranged in a common plane symmetrically around the nozzle means, each of the guns being equidistant from one another.

14. Apparatus as defined in claim 13, wherein the nozzle means includes a converging section forming an extension of the combustion chamber means and arranged for receiving the fluid flow generated by the combustion chamber means.

15. Apparatus as defined in claim 14, further including control means connected to the plurality of ion generating guns for selectively controlling the output of same, each of the guns being separately controllable for varying the size and symmetry of the throat area of the nozzle means.

16. A method of varying a throat of a converging-diverging nozzle, comprising the steps of:
 (a) forming a throat area between spaced converging and diverging nozzles by directing a plurality of impinging ion streams toward a common point within the throat area; and
 (b) changing the ion streams independently of one another, and varying the size and symmetry of the throat area as desired.

* * * * *